US006468420B1

(12) United States Patent
Kunkel

(10) Patent No.: US 6,468,420 B1
(45) **Date of Patent: *Oct. 22, 2002**

(54) DEVICE FOR DEGERMINATING WATER PASSING THROUGH A SANITARY DEVICE

(75) Inventor: Horst Kunkel, Stuttgart (DE)

(73) Assignee: Hansa Metallwerke AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/486,198

(22) PCT Filed: Jul. 14, 1998

(86) PCT No.: PCT/EP98/04358

§ 371 (c)(1),
(2), (4) Date: May 25, 2000

(87) PCT Pub. No.: WO99/10280

PCT Pub. Date: Mar. 4, 1999

(30) Foreign Application Priority Data

Aug. 22, 1997 (DE) ........................................ 197 36 634

(51) Int. Cl.[7] .................................................. C02F 1/32

(52) U.S. Cl. ...................... 210/90; 422/186.3; 340/626; 210/97; 210/192

(58) Field of Search ............................. 210/85, 90, 97, 210/748, 741, 192; 422/24, 186.3; 340/626

(56) References Cited

U.S. PATENT DOCUMENTS 4,676,896 A * 6/1987 Norton
4,694,179 A * 9/1987 Lew et al.
4,849,100 A * 7/1989 Papandrea
5,547,590 A * 8/1996 Szabo
5,779,911 A * 7/1998 Haug et al.

FOREIGN PATENT DOCUMENTS

DE 3924350 A * 1/1991

* cited by examiner

*Primary Examiner*—Joseph W. Drodge
*Assistant Examiner*—Terry K. Cecil

(57) ABSTRACT

A device for degerminating water passing through a sanitary appliance subjects water flowing through a housing and a filtering device in the housing, to radiation, thereby destroying the micro-organisms in the water and/or the filtering device. An energy supply circuit 10 for a UV lamp is controlled by an electronic control unit which receives a "switch-on" signal produced as follows: when a manually-operated valve 4 in a fresh water supply is opened, pressure on a pressure sensor 5 falls; a magnetic valve 6 initially remaining closed. A corresponding electrical signal is then sent to the electronic control unit, which activates the energy supply circuit and opens the magnetic valve 6 in a set time sequence. When the manually-operated valve 4 is closed, the pressure on the pressure sensor 5 rises. The corresponding electrical signal is then sent to the electronic control unit, which in turn deactivates the energy supply circuit according to certain time factors.

12 Claims, 2 Drawing Sheets

DEVICE FOR DEGERMINATING WATER PASSING THROUGH A SANITARY DEVICE

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to a device for sterilizing water flowing through a sanitary appliance, having a) a housing, which comprises an inlet and an outlet for the water;

b) a UV lamp, which is disposed inside the housing and the radiation of which is directed towards the water flowing through and optionally towards a filtering apparatus likewise disposed in the housing;

c) a power supply circuit for the UV lamp;

d) a device for producing a switch-on and switch-off signal for the power supply circuit of the UV lamp, which is operationally coupled to a valve lying in the fresh water supply conduit and operable by the user.

TECHNICAL FIELD

In recent years the dangers arising in the field of sanitation from water contaminated with micro-organisms, in particular bacteria, amoebae or other monocellular organisms, have become ever clearer. For said reason, increased importance is being attached to water sterilization. In said connection, there have been reports of experiments to sterilize flowing water through exposure to UV light, which is of a wavelength suitable for killing micro-organisms carried along in the water. To extend the retention time of said micro-organisms in the region of the UV lamp, an additional filtering apparatus may be used.

In the devices known from said experiments, the UV lamp was activated when the water flow is set in operation, e.g. by means of a mechanical switch which was mechanically connected to the operating element of the valve controlling the water flow. Said manner of signalling the request of the user for flowing water was however relatively unreliable, particularly when the valve operable by the user was opened to only a very slight extent.

SUMMARY OF THE INVENTION

The object of the present invention is to refine a device of the type described initially for sterilizing water flowing through a sanitary appliance in such a way that the request of the user to remove water and to terminate said removals of water is reliably indicated and may be electronically processed.

Said object is achieved according to the invention in that in the fresh water supply conduit a solenoid valve is disposed upstream of the valve operable by the user and that situated in the fresh water supply conduit between the solenoid valve and the valve operable by the user is a pressure sensor, the signal of which is utilized as a switch-on and switch-off signal of the power supply circuit for the UV lamp and the solenoid valve.

Thus, according to the invention, a mechanical movement at the valve operable by the user is no longer transmitted to an electrical switch. Rather, the pressure in the portion of the fresh water supply conduit lying between the solenoid valve and the valve operable by the user is utilized as a "sensor" for the request of the user to remove water or terminate the removal of water. A pressure drop in said portion of the fresh water supply conduit is interpreted as an indication that the valve operable by the user has been opened and hence as a request by the user to draw off water. Thus, as soon as such a signal is detected, the UV lamp is switched on and the initially closed solenoid valve is opened. A renewed increase of the pressure in the relevant portion of the fresh water supply conduit is a sign that the user has closed the valve operable by him and therefore no longer wishes to draw off water. In said case, —optionally after a time delay—the UV lamp may be switched off the solenoid valve closed.

Processing of the signal produced by the pressure sensor may be effected "directly" in the sense that the actual pressure value is determined and, when it lies below a comparison value, the UV lamp is activated. Thus, for as long as the pressure value lies below the comparison value in question (and optionally for a specific time delay thereafter) the UV lamp is alight. Once the pressure value measured by the pressure sensor rises above the comparison value again (and optionally after a specific delay), the UV lamp is switched off again. With said type of signal processing, therefore, a single passing of the measured pressure value through the comparison value is sufficient to effect a change in the operating state of the UV lamp.

In order to prevent pressure surges, of the type which frequently occur in the fresh water supply conduit of buildings, from leading to misinterpretation of the control electronics, the pressure sensor electronics which process the output signal of the pressure sensor may comprise an integration element, which integrates the output signal of the pressure sensor over a specific period of time, which is longer than the typical duration of pressure surges in the fresh water supply conduit. Such randomly occurring pressure surges, which are generally attributable to the opening and closing of appliances at another point in the building, may in said manner be "averaged" and rendered harmless.

A more sensitive electronic processing of the output signal supplied by the pressure sensor may be achieved by providing control electronics, which cyclically open and close the solenoid valve via a valve driver circuit. Said opening and closing operations need not be fully effected; it is frequently sufficient merely to start and then reverse said operations in order to obtain an acceptable signal.

The frequency of said cyclical opening and closing should be between 0.1 and 10 Hz.

The advantage offered by the cyclical opening and closing is that the further processing of the output signal of the pressure sensor may be effected using alternating current techniques. By virtue of the continuous repetition of the signal in question, detection is reliably possible even when the device is at its sensitivity limit.

Particularly preferred is the refinement of the invention, in which the pressure sensor electronics supply the control electronics with a differentiated signal denoting the change of the pressure at the pressure sensor, wherein the control electronics activate the power supply circuit for the UV lamp for the period of time, during which a signal denoting a pressure change, in particular a pressure drop, at the pressure sensor is supplied to them, and optionally for a predetermined period of time thereafter. Said type of signal processing is therefore geared no longer to the absolute value of the pressure, which the pressure sensor measures, but only to the change, in particular drop, of said pressure. So long as during the cyclical opening and closing of the solenoid valve the pressure sensor detects a change, occurring at the same frequency, of the pressure in the portion of the fresh water supply conduit, this means that the valve operable by the user is open, i.e. the user wishes to draw off water. It is only when the valve operable by the user is closed that the pressure prevailing in the relevant portion of the fresh water conduit and measured by the pressure sensor becomes constant in time. Then—optionally after a specific time delay—the UV lamp may be switched off.

The (at least partial) cyclical opening and closing of the solenoid valve may be. effected continuously. In said case, the pressure prevailing in the relevant portion of the fresh water conduit is continuously "topped up" while the valve operable by the user is closed; leakages, particularly in the valve operable by the user, then do not lead to false tripping of the UV lamp.

Alternatively, it is however also possible for the solenoid valve to be cyclically opened and closed only during the time when the valve operable by the user is open. In said refinement, therefore, the cyclical opening and closing of the solenoid valve serves merely to enable improved detection of the closing of the valve operable by the user. An advantage in terms of detection of the opening of said valve is not provided here. On the other hand, the energy consumption of the device in said case is very much lower because the solenoid valve need be energized only during very much shorter periods of time; the solenoid valve is moreover spared. Said last-mentioned refinement of the signal processing is imperative when the solenoid valve is additionally intended to regulate the water flow, e.g. when the water flow is to start only with a specific time delay after opening of the valve operable by the user.

BRIEF DESCRIPTION OF THE DRAWINGS

An embodiment of the invention is described in detail below with reference to the drawings.

DETAILED DESCRIPTION OF THE INVENTION

Figure 1:
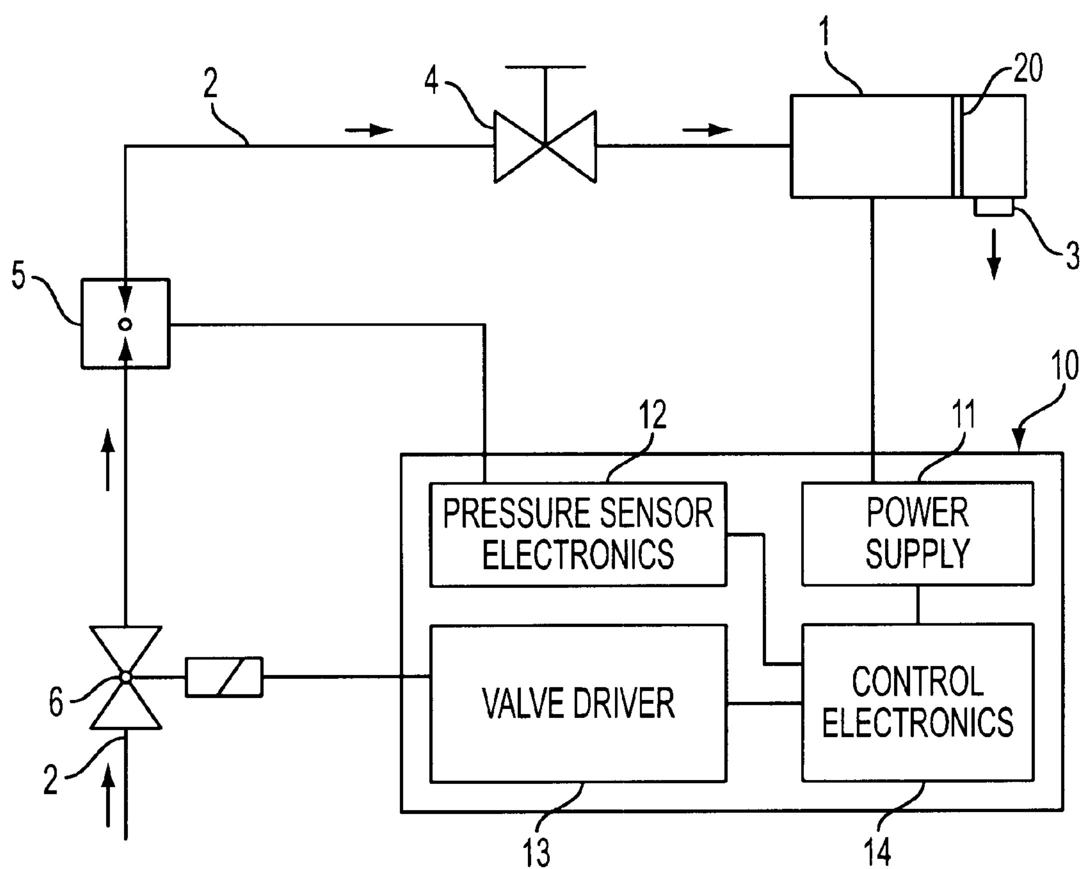
FIG. 1 diagrammatically shows a block diagram ant the associated hardware components of a device for sterilizing and filtering water flowing through a sanitary draw-off appliance.
Figure 2:
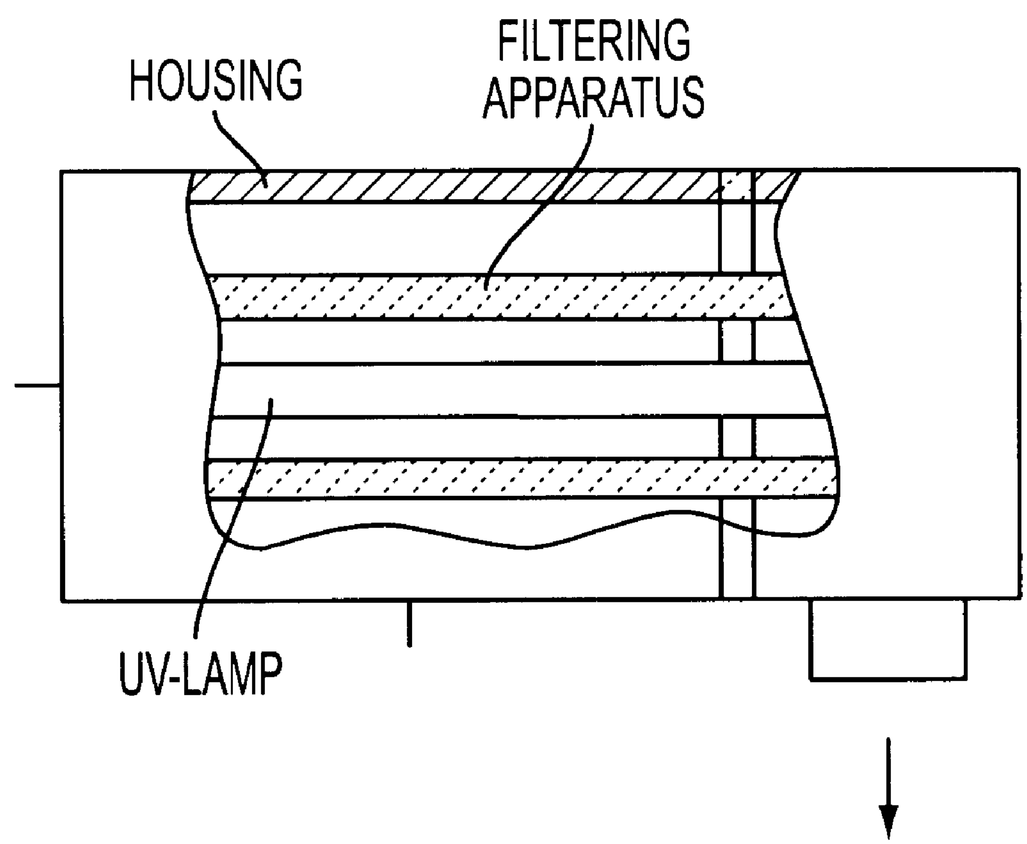
FIG. 2 shows a UV lamp, a housing, and a filtering apparatus.

In the drawing a sanitary draw-off appliance having the reference character 1 is diagrammatically illustrated, which in the illustrated embodiment may be thought of as a bathtub outlet but may alternatively be part of a complete sanitary appliance containing the valve, e.g. a single-lever mixer. Instead of the bathtub outlet 1, the appliance may alternatively be a shower or the like.

So that the user is not irritated by the delay before the water starts to flow, a display 20 is integrated in the bathtub outlet 1. The display lights up as soon as the UV lamp is activated, and indicates to the user that the device is working.

The bathtub outlet 1 is supplied via a fresh water supply conduit 2 with water which may contain micro-organisms such as amoebae, bacteria or similar monocellular organisms. To eliminate the latter, a UV lamp and a filtering apparatus (not shown) are integrated inside the bathtub outlet 1. The UV lamp irradiates the water flowing through as well as the filtering apparatus and thereby kills the micro-organisms which are carried along by the water and/or retained by the filtering apparatus. Extensively germ-free, filtered water therefore passes out of the outlet opening 3 of the bathtub outlet 1.

The drawing shows upstream of the bathtub outlet 1 a valve 4 operable by the user, which may be either a valve operated mechanically through the direct action of force of the user or a solenoid valve indirectly controlled without contact by the user. Further upstream, a pressure sensor 5 is installed in the fresh water supply conduit 2; the fresh water is fed to said pressure sensor by a solenoid valve 6, which is the first "element" in the fresh water supply conduit 2.

The circuit arrangement used to operate the previously described hardware components 1 to 6 is denoted as a whole in the drawing by the reference character 10. The circuit arrangement 10 comprises a power supply circuit 11 for the UV lamp integrated in the bathtub outlet 1, pressure sensor electronics 12 which process the pressure signal supplied by the pressure sensor 5, a valve driver circuit 13 which energizes the solenoid valve 6, and control electronics 14 which control the interaction of the previously mentioned part-components of the circuit arrangement 10.

The previously described circuit arrangement operates as follows:

The components 5 and 6 lying upstream of the user-operated valve 4 inside the fresh water supply conduit 2 serve as a device for producing a switch-on signal in the following manner:

As the initial situation, it is assumed that the valve 4 operated by the user is closed, i.e. no water is flowing out of the outlet opening 3. The pressure sensor 5 installed in the conduit portion between the upstream solenoid valve 6 and the user-operated valve 4 measures the full system pressure, which still exists from the preceding working cycle. When the valve 4 is then opened through the action of the user, the pressure dramatically drops at the pressure sensor 5. The pressure sensor electronics 12 supply a corresponding signal to the control electronics 14, which identify the user's "request" to draw off water from the bathtub outlet 1. They activate the power supply circuit 11 for the UV lamp situated in the bathtub outlet 1, which lamp is then ignited, and optionally after a time delay the valve driver circuit 13. The latter energizes the solenoid valve 6 so that the latter opens. Fresh water then flows through the fresh water supply conduit 2, past the pressure sensor 5 and through the valve 4, which has already been opened by the user, to the bathtub outlet 1 where it may flow past the UV lamp, through the filtering apparatus and, having thus been purified, out of the outlet opening 3 of the bathtub outlet 1.

When the user requires no more water, he then (again directly or indirectly) closes the valve 4. The pressure sensor 5 senses the pressure rise caused thereby. The corresponding signal is supplied by the pressure sensor electronics 12 to the control electronics 14. The latter then close the solenoid valve 6 by means of a corresponding signal supplied to the valve driver circuit 13 and moreover—optionally after a specific time delay—deactivate the power supply circuit 11 for the UV lamp situated in the bathtub outlet 1.

To prevent pressure surges in the fresh water supply conduit from leading to an unwanted response of the control electronics, the pressure sensor electronics 12 comprise an integration element, which over a specific time integrates the measuring signal produced by the pressure sensor 5 and hence "smooths" temporary pressure surges.

The circuit arrangement described above may also be operated "dynamically". By said means the sensitivity of the device for producing a switch-on signal may be further increased, particularly when only small opening cross sections are adjusted by the user at the manually operated valve 4.

Given said "dynamic" mode of operation, the solenoid valve 6 is cyclically at least partially opened and closed by the control electronics 14 via the valve driver circuit 13. The frequency of said cyclical operation may range from several Hz to around 0.1 Hz. Solenoid valves are currently available, in which such a cyclical opening and closing may be effected by means of a suitable closing characteristic without pressure impacts or other losses of comfort.

The mode of operation substantially corresponds to the "static" mode of operation described above, with the following exceptions:

When the device is in "standby" state, i.e. the manually operated valve 4 is closed, the cyclical opening of the solenoid valve 6 ensures that the static pressure is still maintained in the portion of the fresh water supply conduit 2 containing the pressure sensor 5, even when there are no leakages in said conduit portion or the manually operated valve 4. The pressure at the pressure sensor 5 is therefore continuously "topped up".

Upon production of a switch-on signal, i.e. upon opening of the manually operated valve 4, the following is achieved by the cyclical switching on and off of the solenoid valve 6: when the circuit arrangement is at its sensitivity limit, e.g. because the manually operated valve 4 is opened to only a very slight extent and so the pressure drop at the pressure sensor 5 is also only relatively slight, through the repetition of the pressure change at the pressure sensor 5 an increased reliability of detection may be achieved. Furthermore, an increase in sensitivity is possible owing to the fact that the pressure sensor electronics no longer respond to the absolute pressure signal of the pressure sensor 5 but comprise a differentiation module. The latter therefore determines, no longer the absolute value of the pressure in the portion of the fresh water supply conduit between the solenoid valve 6 and the manually operated valve 4, but the pressure change. The corresponding signal may be easily further processed electronically. Upon the production of a switch-on signal for the control electronics 14, therefore, the cyclically occurring pressure drop at the pressure sensor 5, for example, would be processed as a negative signal by the pressure sensor electronics 12 and supplied as a "switch-on signal" to the control electronics.

Closing of the manually operated valve 4 is in said case detected through the loss of the cyclically occurring pressure drop signal at the pressure sensor 5 because, when the manually operated valve 4 is closed, a constant pressure, namely the system pressure, arises within a short time in the portion of the fresh water supply conduit 2 between solenoid valve 6 and manually operated valve 4.

What is claimed is:

1. Device for sterilizing water flowing through a sanitary appliance, having a) a housing, which comprises an inlet and an outlet for the water;

b) a UV lamp, which is disposed inside the housing and the radiation of which is directed towards the water flowing through the housing;

c) a power supply circuit for the UV lamp;

d) a device for producing a switch-on and switch-off signal for the power supply circuit of the UV lamp, which is operationally coupled to a valve situated in a fresh water supply conduit and operable by the user, wherein in the fresh water supply conduit a solenoid valve is disposed upstream of the valve operable by the user and situated in the fresh water supply conduit upstream from the UV lamp and between the solenoid valve and the valve operable by the user is a pressure sensor, the signal of which is utilized as a switch-on and switch-off signal of the power supply circuit for the UV lamp and the solenoid valve.

2. Device according to claim 1, wherein a pressure sensor electronics, which process an output signal of the pressure sensor, comprise an integration element which integrates the output signal of the pressure sensor over a period of time which is longer than the typical duration of pressure surges in the fresh water supply conduit.

3. Device according to claim 1, wherein control electronics are provided, which cyclically open and close the solenoid valve periodically via a valve driver circuit.

4. Device according to claim 3, wherein the frequency of the cyclically opening and closing is between 0.1 and 10 Hz.

5. Device according to claim 3, wherein a pressure sensor electronics, which process an output signal of the pressure sensor, supply the control electronics with a differentiated signal denoting the change of the pressure at the pressure sensor, and the control electronics activate the power supply circuit for the UV lamp for a period of time during which a signal denoting a pressure change at the pressure sensor is applied to the pressure sensor electronics.

6. Device according to claim 3, wherein the control electronics are adapted to continuously cyclically open and close the solenoid valve periodically.

7. Device according to claim 3, wherein the control electronics are adapted to cyclically open and close the solenoid valve only during a time when the valve operable by the user is open.

8. Device according to claim 1, wherein the radiation of the UV lamp is disposed towards a filtering apparatus disposed in the housing.

9. Device according to claim 5, wherein the pressure sensor electronics are arranged to supply the control electronics with a differentiated signal denoting a pressure drop.

10. Device according to claim 5, wherein the pressure sensor electronics are arranged to supply the control electronics with the signal denoting a pressure change for a predetermined period of time after the signal denoting a pressure change is supplied.

11. Device for sterilizing water flowing through a sanitary appliance, having a housing, which comprises an inlet and an outlet for the water;

a UV lamp, which is disposed inside the housing and the radiation of which is directed towards the water flowing through the housing;

a power supply circuit for the UV lamp;

a device for producing a switch-on and switch-off signal for the power supply circuit of the UV lamp, which is operationally coupled to a valve situated in a fresh water supply conduit and operable by the user, wherein in the fresh water supply conduit a solenoid valve is disposed upstream of the valve operable by the user and situated in the fresh water supply conduit between the solenoid valve and the valve operable by the user is a pressure sensor, the signal of which is utilized as a switch-on and switch-off signal of the power supply circuit for the UV lamp and the solenoid valve, and wherein control electronics are provided, which cyclically open and close the solenoid valve via a valve driver circuit, and wherein the frequency of the cyclical opening and closing is between 0.1 and 10 Hz.

12. Device according to claim 11, wherein the radiation of the UV lamp is disposed toward a filtering apparatus disposed in the housing.

* * * * *